March 5, 1957 R. C. FERGASON 2,783,602
COTTON SPINDLE DRIVING ASSEMBLY
Filed June 18, 1953 3 Sheets-Sheet 1

Inventor
Rector C. Fergason
by Kimball S. Wyman
Attorney

March 5, 1957 R. C. FERGASON 2,783,602
COTTON SPINDLE DRIVING ASSEMBLY
Filed June 18, 1953 3 Sheets-Sheet 2

Inventor
Rector C. Fergason
By Kimball S. Wyman
Attorney

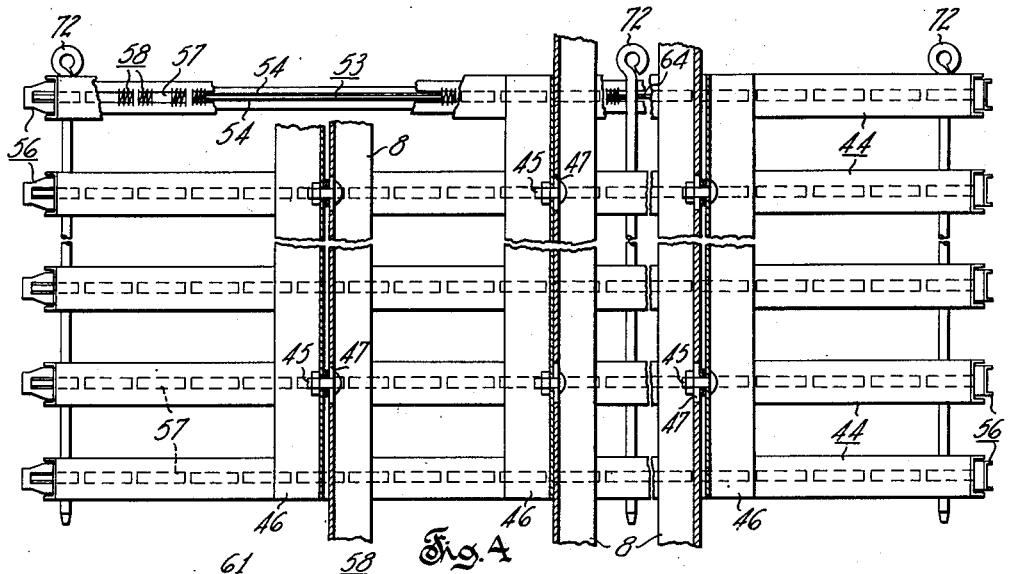
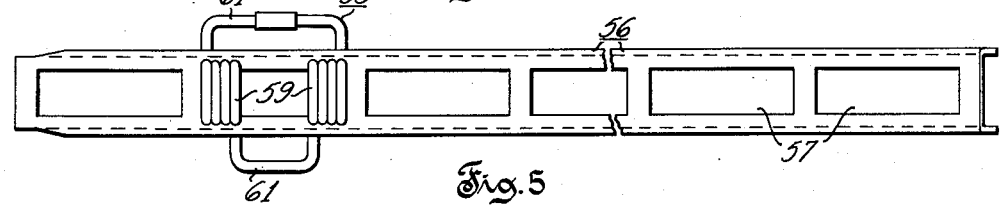
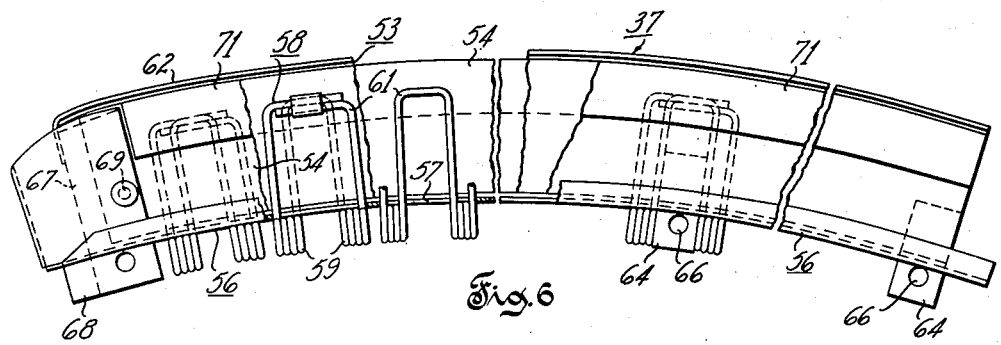

United States Patent Office 2,783,602
Patented Mar. 5, 1957

2,783,602

COTTON SPINDLE DRIVING ASSEMBLY

Rector C. Fergason, Gadsden, Ala., assignor to Allis-Chalmers Manufacturing Company, Milwaukee, Wis.

Application June 18, 1953, Serial No. 362,456

11 Claims. (Cl. 56—42)

This invention relates to cotton harvester machines of the type wherein rotary picking spindles are moved through a plant confining tunnel or the like, and is more particularly concerned with an improvement in the spindle driving mechanism designed to simplify the construction and assembly of parts, to provide a more effective drive, and to minimize wear on the driving and driven elements of the mechanism.

In a construction heretofore employed, the spindles are mounted on a series of longitudinally spaced vertically disposed slats carried by upper and lower chains operatively associated with a pair of vertically spaced driving sprockets and with a similarly spaced pair of idler sprockets. These pairs of sprockets are rotatably mounted on the picker unit frame in adjacent relation to fore and aft portions of the plant tunnel. The tunnel side of the picker frame is formed in part by a series of outwardly bowed channel members fixedly welded to the main frame to extend longitudinally of the tunnel in generally parallel vertically spaced relation to each other. A series of vertically spaced picking spindles are rotatably mounted in each slat to present longitudinally aligned rows of outer picking portions which project transversely across the plant tunnel as the slats move therealong, and to present exposed longitudinally aligned vertically spaced enlarged cylindrical portions frictionally engaging vertically opposite sides of a spindle drive assembly removably associated with each of the aforementioned channel members.

In this prior construction, the spindle drive assemblies each include a T-shaped wear strip having a stem portion positioned between diverging spring elements which in turn are disposed between and engage the inner sides of a pair of plain backing strips each having a spindle engaging thickened drive portion of rubber or other suitable material formed as a part thereof or otherwise fixed to the spindle side of each strip along the outer margin thereof. The wear and backing strips are bowed outward longitudinally similar to the frame channel members, and a spring means is disposed between opposite sides of the stem portion of each wear strip and the adjacent inner side surfaces presented by the pair of associated backing strips.

The spring means preferably comprises a plurality of separate springs each presenting diverging U-shaped leg portions having their inner ends merging with the ends of a pair of spaced axially aligned coil elements. These springs are held in proper longitudinally spaced relation to each other by inserting the oppositely diverging pair of legs of each spring through one of a series of longitudinally spaced openings formed in an outwardly bowed flat retaining strip. This flat retaining strip and the springs assembled therewith are then combined with a similarly bowed open ended coil retaining channel element having a flat base and outwardly converging side walls terminating in spaced gap forming relation to provide a continuous opening through which the legs of the springs project with the flat retaining strip engaging the outer edges of the converging side walls of the coil retaining channel element.

The flat spring retaining members and the spring coil retaining channel elements are also bowed outward longitudinally similar to the channel members and one end of the wear strip and the corresponding ends of the backing strips are united with an attaching part. Completion of the friction drive assembly is effected by inserting the leg portions of the springs between opposite sides of the wear strip and the inner surfaces of the backing strips with the flat spring retaining strip spaced somewhat from the inner edges of the wear and backing strips. The base of the spring coil retaining channel element is of somewhat less width than the base of the frame channel member and is adapted to be disposed therein.

Frictional engagement of the spring legs with the inner surfaces of the backing strips retains the springs and the spring retaining strip and channel element in the as-sembled relation just described and this drive assembly is inserted into the machine by placing the end thereof united with the attaching part between a pair of the spacedly opposed enlarged cylindrical spindle portions at one end of the machine with the spring coil retaining channel element disposed in the adjacent end of the associated frame channel member. When this has been done, the assembly is then pulled into its operative position in the machine by grasping one end of a wire or cable which extends through the space in which the assembly is to be drawn and has its opposite end fixed to the attaching part of the friction drive assembly. With the friction drive assembly positioned in the machine as just indicated, the attaching parts of the assemblies are fixed in the machine by inserting a pin through holes in the attaching parts aligned vertically with similar holes in the corresponding ends of the frame channels. Outward movement of the drive assembly relative to the frame channel members being limited by engagement of the head of the T-shaped wear strip with an inner surface of the slat which bridges the space outwardly between the enlarged cylindrical spindle portions frictionally engaging opposite sides of the drive assembly.

Constructions such as the foregoing are satisfactory when variances in frame construction, particularly the bowed channel members and the guide surfaces for the slat carrying chains, are closely controlled, and when the chain driving sprockets are located at the rear of the picker unit whereby the tight or tensioned run of the chain passes immediately adjacent the plant tunnel. Under these conditions, there is little likelihood that the chain and thereby the slats can move outward materially relative to the frame. Consequently, there is only a remote possibility that there will be sufficient outward relative movement between the spindle drive assembly and slats to effect a cocking over of the backing strips to an extent which will bring side portions thereof into rubbing contact with opposed inner portions of the slats. However, when such contact does occur, whether caused by variances of frame construction or some other reason such as a slat chain drive arrangement wherein the slack run of the chain passes immediately adjacent the plant tunnel, the backing strips soon require replacement. In addition, an appreciable relative outward movement of the drive assembly and slat may reduce the extent of frictional contact between the enlarged cylindrical portions of the spindles and the thickened outer marginal portion of the backing strips sufficiently to cause rapid wear of the latter and/or ineffective spindle rotation.

Further, closely controlling frame variances materially increase the initial cost, and in addition such controls haven't been entirely successful in eliminating the aforementioned difficulties in picker units employing a chain drive arrangement wherein the slack run of the chain passes immediately adjacent the plant tunnel. Furthermore, while the use of two spring retaining elements, the flat spacing strip and the coil retaining channel, afford material advantages over constructions heretofore employed, it is also desirable to minimize the initial and assembly costs of the spring retaining structure.

Accordingly, the present invention is especially concerned with and has an object the provision of a picker structure and a spindle drive assembly incorporating improved features of construction and combination eliminating the necessity for closely controlling manufacturing variances.

Another object of the present invention is the provision of a spindle drive assembly and picker frame structure operatively combinable in an improved manner nullifying the effect of employing a slat chain drive arrangement wherein the slack run of the chain passes immediately adjacent the plant tunnel in the picker unit and/or the effect of slackness produced by the chain guide surfaces becoming worn.

Still another object of the invention is the provision of a spindle drive assembly incorporating improved features of construction enabling the assembly to be readily mounted in a cotton picker unit in substantially fixed relation thereto.

A further object of the present invention is to provide a spindle drive assembly incorporating improved features of spring retainer and spacer construction which minimizes the cost of parts employed, and which aids materially in retaining the backing strips in their proper operative relation to the wear strip.

An additional object of the present invention resides in providing a spindle drive assembly embodying a simplification of construction and parts effective to materially reduce the cost of manufacture, assembly and maintenance.

Accordingly, the present invention may be considered as comprising the various features of construction, combination and/or subcombination as is hereinafter more fully set forth in the detailed description and appended claims. Reference being also directed to the accompanying drawings which show a preferred embodiment of the invention, and wherein:

Fig. 4 is a partial vertical longitudinal section taken on line IV—IV of Fig. 2;

Fig. 5 is an enlarged side elevation view of the U-shaped spring retainer with some of springs in position thereon; and Fig. 6 is an enlarged plan view of the stationary spindle drive assembly which is to be pulled into the machine with portions broken away to better show certain of the parts in their assembled relationship.

Figure 1:
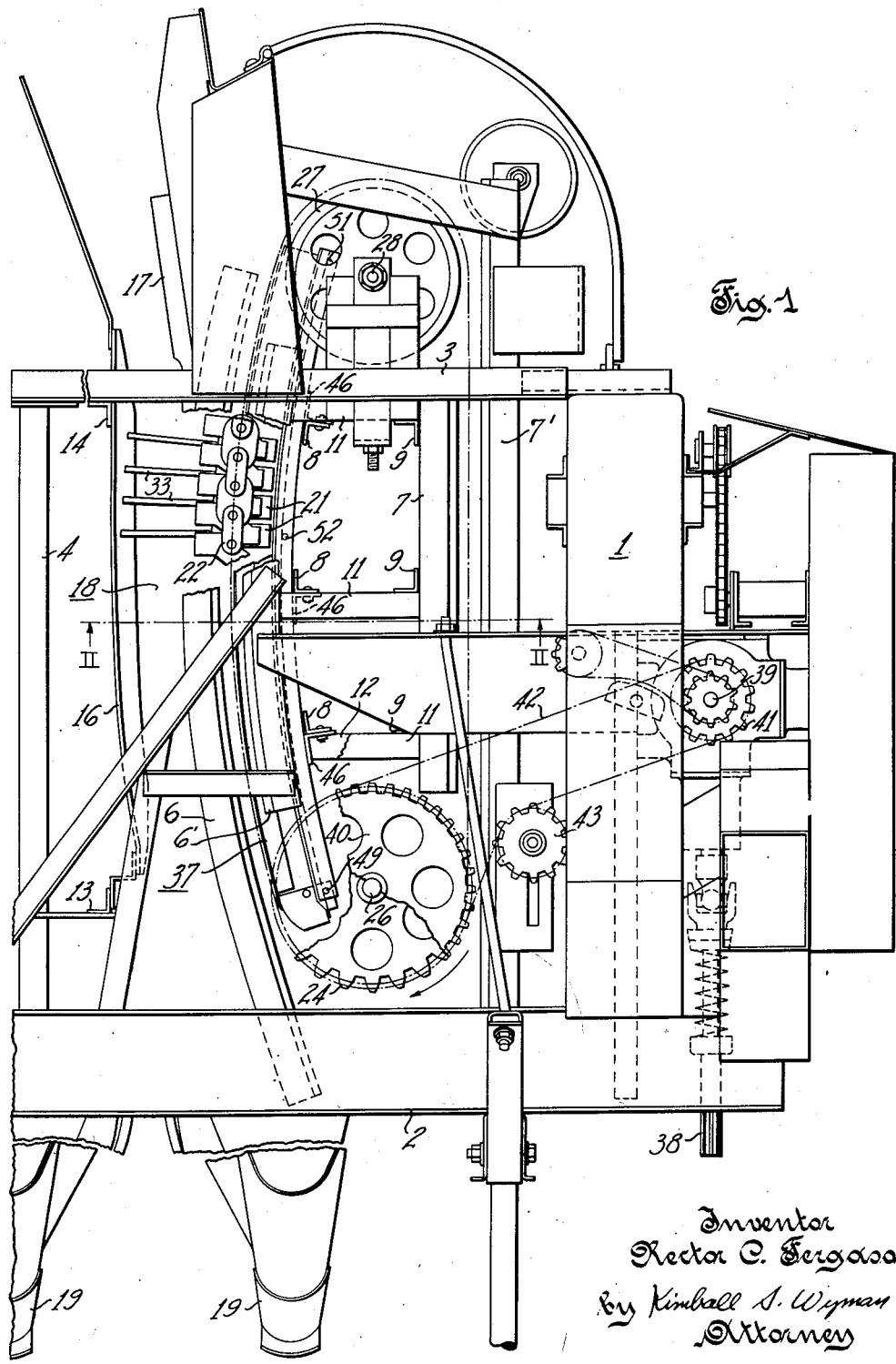
Fig. 1 is a fragmentary plan view of picker unit embodying the invention with parts broken away to better show the coaction of essential parts.
Figure 2:
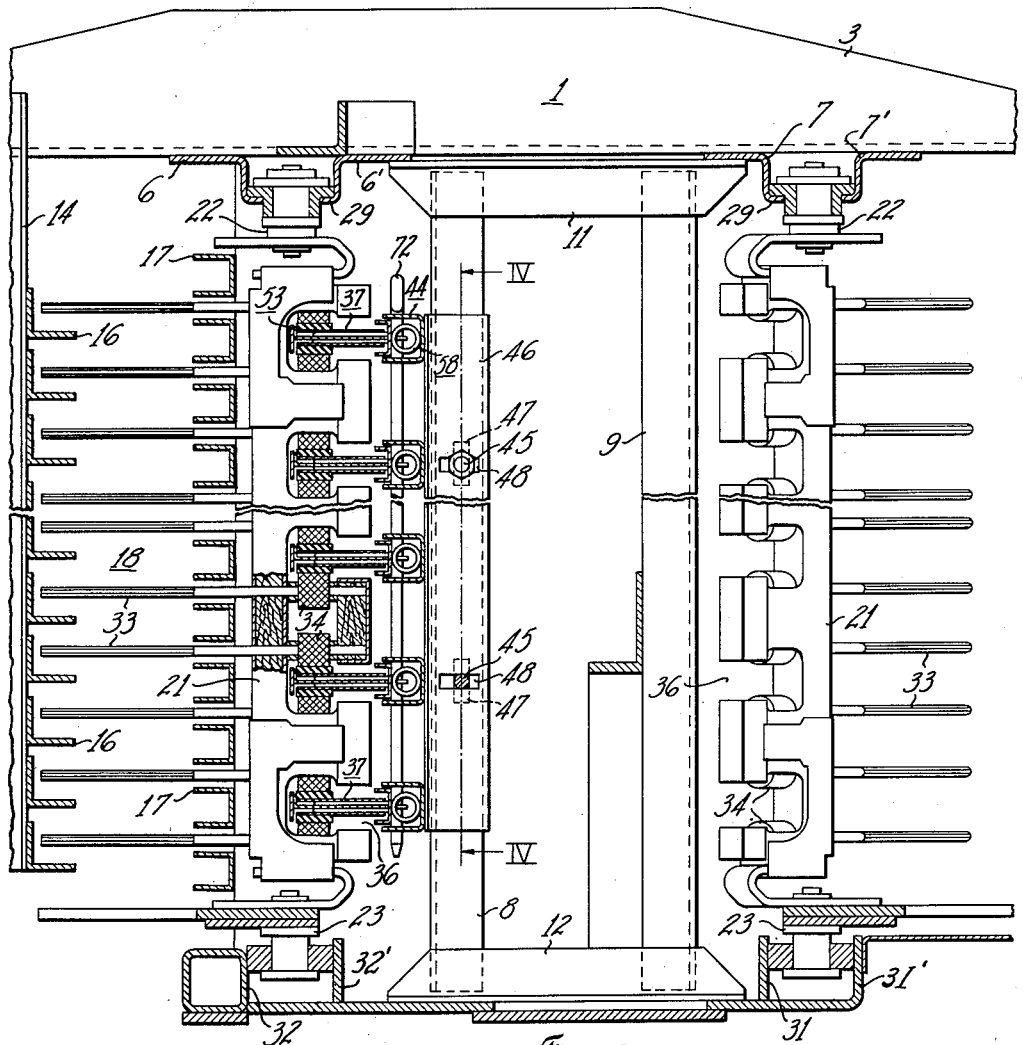
Fig. 2 is an enlarged fragmentary partial transverse vertical section taken on line II—II of Fig. 1.

Referring to the drawings, Fig. 1 shows a rotary spindle type picking unit 1 adapted to be operatively attached to a suitable propelling vehicle such as a tractor or the like (not shown). The picking unit has a generally rigid top frame structure comprising a rigid top forward cross member 2 and a rear cross member 3 fixedly united by a plurality of longitudinally extending frame elements including a side element 4, a first pair of coacting elements 6, 6' (Fig. 2) and a second pair of coacting elements 7, 7' (Fig. 2). Referring also to Figs. 1, 2 and 4, it will be noted that the frame structure further includes a tunnel side group of three longitudinally spaced vertically extending angle members 8 and a laterally spaced inner group of similarly spaced members 9. The laterally opposite top and bottom portions of the members 8 and 9 are rigidly united by similar transverse frame elements 11 and 12, respectively.

One side of the frame structure (note Figs. 1 and 2) is provided with longitudinally spaced front and rear vertically extending angle members 13 and 14, respectively, these angle members mounting a series of vertically spaced longitudinally extending angle elements 16, the latter being disposed in laterally spaced relation to a similar series of vertically spaced longitudinally extending channel elements 17 secured to front and rear vertically extending frame members (not shown). The lateral spacing of these channel elements forms a plant confining tunnel 18 therebetween which extends longitudinally through the unit in the direction of travel. And the forward end of the unit is provided with a pair of laterally spaced plant gathering or divider points 19 aligned with said tunnel for directing the plants thereinto as the unit is propelled along the plant row.

The picking mechanism comprises a series of vetrically disposed longitudinally spaced slats 21 having their upper ends hingedly connected to upper chain 22 and having their lower ends hingedly connected to a lower endless carrier such as the chain 23, the chains being operatively trained around a pair of vertically spaced drive sprockets 24 fixed on a vertical shaft 26 rotatably mounted adjacent the front of the unit and around a pair of vertically spaced idler sprockets 27 mounted on a shaft 28 disposed adjacent the rear of the unit. The upper and lower chains are of the roller type and sagging of the upper runs between sprockets is prevented by similar laterally spaced longitudinally extending roller supports 29 formed by similarly depending portions of the pairs of frame elements 6, 6' and 7, 7'. The lower chain has its rollers guidingly mounted between inner and outer pairs of vertically extending elements 31, 31' and 32, 32', respectively, these pairs of elements extending longitudinally of the machine in the general direction of chain travel and in underlying parallel relation to the roller supports 29.

Each slat 21 rotatably mounts a series of vertically spaced spindles having picking portions 33 which extend outward from the slat between the channel elements 17 forming the inner wall of the plant tunnel and across the tunnel with their outer terminal ends disposed between the vertically spaced angle elements 16 forming the outer wall of the tunnel. The spindles each have an enlarged cylindrical portion 34 and the inner side of each slat structure is provided with a similar series of recesses 36 which partially expose vertically opposite pairs of said cylindrical portions, these vertically opposite pairs of cylindrical portions being aligned longitudinally of the unit to provide a space therebetween into which is inserted a stationary friction drive assembly 37. The longitudinally aligned vertically opposite pairs of said enlarged cylindrical portions frictionally engage opposite sides of the assembly 37 disposed therebetween and are thereby rotated as the slats move longitudinally of the machine in adjacent relation to the plant tunnel 18.

In the construction shown, power is transmitted to the front drive sprockets through means of a power input shaft 38 adapted for operative detachable connection with a suitable tractor power take-off element (not shown). Shaft 38 is geared to a vertically disposed shaft 39 having a sprocket 41 at its upper end in horizontal alignment with a sprocket 40 attached to the upper one of said vertically spaced drive sprockets 24. A chain 42 operatively connects sprocket 41 with sprocket 40, this chain preferably passing around an idler sprocket 43. The direction of rotation of shaft 38 and sprocket 41 are such that the drive sprockets 24 on the picker unit rotate in a clockwise direction as viewed in Fig. 1, and consequently the slack runs of the chains are disposed immediately adjacent the plant tunnel 18.

Figure 3:
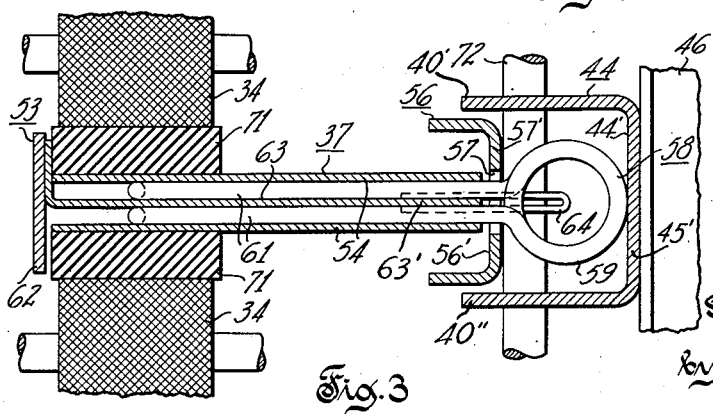
Fig. 3 is an enlarged view of one of the frictional drive assemblies shown in Fig. 2.

Referring also to Figs. 3 and 4 it will be noted that the friction drive assembly 37 comprises a series of longitudinally extending vertically spaced U-shaped channel members 44 fixedly attached to longitudinally spaced angle elements 46 arranged to extend vertically alongside the frame elements 8. These angle elements are adjustably secured to the frame elements 8 by means of bolts 45 and elongated openings 47 in the frame elements disposed at a right angle to similar elongated openings 48 in the angle elements 46, as is best shown in Fig. 2. This construction permits the assembly of channel members 44 and angle elements 46 to be adjusted both vertically and horizontally relative to the main frame and consequently relative to the slat structures disposed adjacent thereto. In this connection it is to be particularly noted that the adjustment of the channel assembly should be such that each U-shaped channel member 44 is disposed with its open side 44' of web 45' (Fig. 3) directly opposite the space between a longitudinally aligned series of vertically opposite cylindrical spindle portions 34. Further, it will be noted that channel members 44 are each similarly bowed outward toward the plant tunnel and that the flanges 40' and 40'' of each member are provided with pairs of vertically aligned holes therethrough with the holes in each member vertically aligned with the similar pairs of holes in the other channel members, there being a series of such vertically aligned holes adjacent the opposite ends of the channel members and also at a point intermediate the ends thereof. Referring to Fig. 1, the series of vertically aligned pairs of holes adjacent the front end of the channel members are designated 49, those at the rear end 51, and those intermediate the ends 52.

The friction drive assembly, which is designed to be positioned between each longitudinally aligned series of vertically opposite cylindrical spindle portions 34 in coactive relation to the channel member 44 facing same, comprises a wear or rub strip 53 of T-shape cross section, a pair of similar backing strips 54 extending along opposite sides of the stem portion 63 of wear strip 53, a U-shaped spring retainer 56 having its open face 56' facing in the same direction as open face 44' of channel member 44 and having a longitudinal series of spaced elongated openings 57 in the web portion 57' thereof, and a series of springs 58 of which each spring preferably comprises a pair of axially spaced coil portions 59 disposed in registry with an elongated opening 57 in the web portion of the retainer 56, and a pair of integral leg portions 61 which extend through the opening 57 and diverge on opposite sides of the stem portion of a wear strip and between the coacting inner surfaces of the associated pair of backing strips. Each wear strip, reference being also had to Fig. 6, comprises a head portion 62 to which is welded or otherwise suitably secured a stem portion 63, the latter having longitudinally spaced fixed tabs or projections 64 attached to the free end 63' thereof and each tab 64 having an aperture 66 therethrough, the spacing of these tabs being designed for alignment with the series of vertically aligned openings 51 and 52, Fig. 1, extending through the channel members 44. The front end of each wear strip is provided with an attaching part 67 which is fixed thereto, as by welding, and this part projects inward and terminates in an apertured portion 68 somewhat similar to the tab projections 64. Portion 68 is adapted to be disposed in a channel member 44 with its aperture in vertical alignment with the series of apertures 49 in the front ends of the channel members. In addition, attaching part 67 and the stem portion of the wear strip are provided with aligned holes 69 therethrough for receiving a rivet or other suitable fastening means.

Each backing strip has its outer or roller engaging portion provided with a suitable enlargement 71 formed of rubber or other material suitable for frictional driving engagement with the enlarged cylindrical portions of the associated spindles. Spring retainer 56 is of U-shape cross sectional configuration and its flanges are adapted to extend outward beyond the inner edges of the backing strips as is best shown in Figs. 2 and 3. When installed as shown in Fig. 3 the openings 57 in the retainer 56 face the vertically spaced opposite pairs of cylindrical portions 34 with a portion of one of the openings 56 being horizontally opposite the holes 52 (Fig. 1) in its associated channel member 44. Further, the tabs or projections 64 and the apertured portion 68 of attaching part 67 on each wear strip are dimensioned to extend through an elongated opening 57 in the associated retainer strip. In this connection it should be noted that the tab on the intermediate portion of the wear strip extends between the coil sections of the spring disposed in registry with the associated opening 57, whereas there are no springs associated with the openings 57 at the extreme ends of the retainer. However, the apertures in attaching portion 68 and in the tabs 64 are alignable with the vertical series of holes 49, 51 and 52 in the channel members 44. The wear strips, backing strips and the spring retainers are also bowed outward in conformity to the channel members 44.

The friction drive assembly, note Fig. 6, is assembled by placing a pair of backing strips to extend along opposite sides of the stem portion of a wear strip, and when this is done, the front or left-hand ends of these strips are then fixedly united by inserting a rivet, for example, through the hole 69 in the attaching part 67 and the stem portion of the wear strip, it being understood that the corresponding end of each backing strip has a hole therein alignable with the hole 69. Following this the next step, unless previously done, is to mount the springs in the retainer strip 56, which is accomplished by inserting the legs 61 of a spring through one of the openings 57 with the axially spaced coil portions 58 thereof disposed in registry with said opening and in abutting engagement with the web side of the retainer which is to face the web portion of a channel member 44. In this connection it is to be noted that the diverging leg portions engage the opposite sides and the ends of the elongated opening through which they are inserted and thus act in conjunction with the coil portions to retain the springs and retainer in the assembled relation shown in Fig. 5. Upon insertion of a spring in each of the openings as just described, excepting the openings at the extreme ends of the retainers, the spring and retainer assembly is then combined with the wear and backing strips by inserting the legs of the springs between the backing strips and the opposite sides of the stem portion of the wear strip. This assembly is shown in Fig. 6 and it should be noted that the tab projection on the intermediate portion of the wear strip is disposed between the coil portions of the associated spring, i. e. the coil portion straddle the tab with the axis of the aperture in the tab extending at a right angle to the axis of the coil portions 58.

The friction drive assembly is now ready for insertion in the machine and this is accomplished by inserting the end embodying attaching part 67 into the rear end of the space provided by a series of longitudinally aligned vertically opposite cylindrical spindle portions 34 with the front end of retainer strip 56 partially nested within the associated channel member 44 whereupon a cable or wire, which is fastened to attaching part 67 and extends forwardly through the space into which the assembly is to be drawn and out the front end of the machine, is then pulled forward until the assembly is positioned as shown in Fig. 1. When so installed (Fig. 3) a portion of the stem 63 is disposed between the cylindrical portions and the free end portion 63' of stem 63 has the tab 64 extending through the opening 57 in the retainer 56. When thus positioned the apertured attaching portion 68 is in alignment with the vertically aligned series of apertures 49 at the forward end of the channel members 44, the tab apertured projections 64 on the intermediate and opposite end portions of the wear strip are also in alignment with the similar series of aligned holes 52 and 51, respectively. Next the assembly is fixed in its operative position by inserting elongated pin elements 72, having a looped end, through the aforementioned aligned series of holes and apertures as is best indicated in Fig. 4.

When the drive assembly is thus secured in the machine, it should be apparent that it cannot move outward relative to the fixed channel members 44 and further it should be clear that the inner edges of the backing strips are confined between the flanges of the U-shaped spring retainer 56 thus preventing the portions of the backing strips remote, from the head portion of the T-shaped wear strip from moving outward toward the adjacent sides of the associated recesses in the slat structures. Of course, it will be appreciated that outward movement of a pair of backing strips relative to the associated spring retainer is prevented by the outer edges thereof being in engagement with the inner face of the head portion 62 of the T-shaped wear strip. Consequently it will be appreciated that should there be a tendency for the chain, and consequently the slats to move outward toward the plant tunnel relative to the channel members because of manufacturing tolerances and/or wear on the chain rollers and/or the guide elements therefor, the friction drive assembly cannot move accordingly since the attaching part 67 and the tab projections 64 are fixedly secured to the channel members 44. As a result, this construction effectively eliminates the possibility of the wear strips coming into contact with the moving slat and being therefore damaged and/or quickly worn out.

In addition, this constructon, particular reference being had to the adjustable assembly of the channel members 44, also eliminates the necessity of attempting to maintain close manufacturing tolerances in order to maintain the friction drive assembly accurately positioned relative to the channel members 44 and relative to the slats 21. Furthermore, it will be appreciated that the use of a U-shaped spring retainer 56 minimizes the number of parts required to effectively space and maintain the springs 58 in their proper operative relationship relative to the stem portion of the wear strip and to the sides of the backing strips. Moreover, as previously mentioned, the use of a U-shaped retainer partially nested within the associated channel member 44 effectively prevents a vertical movement of the retainer relative to its channel member and relative to the slats.

In view of the foregoing, it will be appreciated that the construction hereinbefore described for purposes of illustration effectively accomplishes all of the advantages and objects previously stated herein. Also it should be understood that while a preferred embodiment of the invention is shown and described for purposes of illustration, it is not intended to limit the protection to be secured to the herein disclosed details of construction and combination as various modifications within the scope of the appended claims may occur to persons skilled in the art.

It is claimed and desired to secure by Letters Patent:

1. In a cotton harvester unit having parts forming a plant confining tunnel extending longitudinally in the general direction of travel and having a picking mechanism operatively mounted on said unit including a series of spaced apart vertically extending slats each rotatably supporting a series of vertically spaced spindles presenting picking portions extending transversely from one side of said slat into said tunnel and presenting cylindrical portions disposed in the other side of said slat and arranged in spaced vertically opposite pairs aligned longitudinally with corresponding vertically spaced opposite pairs of cylindrical portions on spindles of other slats, said cylindrical portions being mounted for driven frictional engagement with a drive assembly fixed between said cylindrical portions, the combination comprising: a channel member fixedly mounted on said unit to extend along the other side of said slat in generally parallel opposite relation to a longitudinally aligned series of said vertically opposite pairs of cylindrical portions with its open side facing said series, said member having a flange provided with a hole extending vertically therethrough intermediate the ends thereof; a spring retainer associated with said channel member and having an opening facing said series of cylindrical portions with a portion of said opening being horizontally opposite said hole; a wear strip of T-shape cross sectional configuration having a portion of its stem disposed between said cylindrical portions in said series, said wear strip having its free end stem portion provided with a tab projection extending through said portion of said opening, said tab being provided with an aperture therethrough in vertical alignment with said hole in said channel member; a pair of backing strips extending along opposite sides of the stem portion of said wear strip; a spring removably combined with said retainer and having an axially spaced pair of coil portions positioned between said retainer and channel member and positioned in registry with said opening in longitudinally straddling relation to said tab projection, said spring having integral leg portions extending through said opening in vertical diverging relation to each other and in vertical straddling relation to said stem, said leg portions being positioned between said stem and said backing strips; and an elongated fastening element inserted through said aligned hole and aperture for preventing relative movement of said wear strip and said channel member.

2. In a cotton harvesting unit having parts forming a plant confining tunnel extending longitudinally in the general direction of travel, and having a picking mechanism operatively mounted on said unit and including a series of spaced apart vertically extending slats each rotatably supporting a series of vertically spaced spindles presenting picking portions extending transversely from one side of said slat into said tunnel and presenting picking portions disposed in the other side of said slat and arranged in spaced vertically opposite pairs aligned longitudinally with corresponding vertically opposite pairs of cylindrical portions on spindles of other slats, said cylindrical portions being mounted for driven frictional engagement with a drive assembly fixed between said cylindrical portions, the combination comprising: a channel member fixedly mounted on said unit to extend along the other side of said slat in generally parallel opposite relation to a longitudinally aligned series of said vertically opposite pairs of cylindrical portions with its open side facing said series, said member having at least one flange provided with a hole extending vertically therethrough intermediate the ends thereof; a spring retainer extending longitudinally with said channel member and having an opening in the side thereof facing said series of cylindrical portions with a portion of said opening being horizontally opposite said hole in said flange; a wear strip of T-shape cross sectional configuration having a portion of its stem disposed between said cylindrical portions in said series, said wear strip having its free stem end provided with a tab projection extending through said portion of said opening in said retainer strip, said tab projection being provided with an aperture therethrough in vertical alignment with said hole, a pair of backing strips extending along opposite sides of the stem portion of said wear strip; a spring removably combined with said retainer and having an axially spaced pair of coil portions positioned between said retainer and channel member in registry with said opening and positioned in longitudinally straddling relation to said tab projection, said spring having integral leg portions extending through said opening in vertical diverging relation to each other and in vertical straddling relation to said stem, said leg portions extending into a position between said wear strip and said backing strips; and an elongated fastening element inserted through said aligned hole and aperture in said channel member and tab projection, respectively, for preventing relative movement of said wear strip and said channel member.

3. In a cotton harvesting unit having parts forming a plant confining tunnel extending longitudinally in the general direction of travel, and having a picking mechanism operatively mounted on said unit and including a series of spaced apart vertically extending slats each rotatably supporting a series of vertically spaced spindles presenting picking portions extending transversely from one side of said slat into said tunnel and presenting cylindrical portions disposed in the other side of said slat, said cylindrical portions being arranged in spaced vertically opposite pairs aligned longitudinally with corresponding vertically opposite pairs of cylindrical portions on spindles of other slats for driven frictional engagement with a drive assembly fixed between said cylindrical portions, the combination comprising: a U-shaped channel member fixedly mounted on said unit to extend along the other side of said slat in generally opposite relation to a longitudinally aligned series of said vertically opposite pairs of cylindrical portions with its open side facing said series, said member having its flanges provided with at least one pair of holes in vertical alignment therethrough intermediate the ends thereof; a spring retainer extending within said channel member and having an opening in the side thereof facing said series of cylindrical portions with a portion of said opening being horizontally opposite said pair of holes in said channel member; a wear strip of T-shape cross sectional configuration having a portion of its stem disposed between said cylindrical portions in said series, and having its free stem end provided with a tab projection extending through said portion of said opening in said retainer, said tab projection being provided with an aperture therethrough in vertical alignment with said pair of holes in said channel member; a pair of backing strips extending along opposite sides of the stem portion of said wear strip; a spring removably combined with said retainer strip and having an axially spaced pair of coil portions positioned between said channel member and retainer in registry with said opening in longitudinally straddling relation to said tab projection, said spring having integral leg portions extending through said opening in vertical diverging relation to each other and in vertical straddling relation to said stem, said leg portions being positioned between said stem and said backing strips; and an elongated fastening element inserted through said aligned holes and apertures in said channel member and tab projection, respectively, for preventing relative movement of said wear strip and said channel member.

4. In a cotton harvester unit having parts forming a plant confining tunnel extending longitudinally in the general direction of travel, and having a picking mechanism operatively mounted on said unit and including a series of spaced apart vertically extending slats each rotatably supporting a series of vertically spaced spindles presenting picking portions extending transversely from one side of said slat into said tunnel and presenting cylindrical portions disposed in the other side of said slat, said cylindrical portions being arranged in spaced vertically opposite pairs aligned longitudinally with corresponding vertically opposite pairs of cylindrical portions on spindles of other slats for frictional engagement with a drive assembly fixed between said cylindrical portions, the combination comprising a U-shaped channel member fixedly mounted on said unit to extend along the other side of said slat in generally parallel opposite relation to a longitudinally aligned series of vertically opposite pairs of said cylindrical portions with its open side facing said series, said member having its flanges provided with at least one pair of holes in vertical alignment therethrough intermediate the ends thereof; a U-shaped retainer partially nested within said channel member with its open side similarly facing said series of cylindrical portions, said retainer having a longitudinal series of spaced elongated openings extending through the web thereof with the midportion of one of said openings being horizontally opposite said pair of holes in said channel member; a wear strip of T-shape cross sectional configuration having its free stem end extending into said retainer and having a portion of its stem disposed between said cylindrical portions in said series, said wear strip having at least one tab projection on its free stem end extending through the midportion of said one hole in said retainer and provided with an aperture therethrough in vertical alignment with a pair of holes in said channel member; a pair of backing strips extending along opposite sides of the stem portion of said wear strip and having their marginal edges adjacent said channel member and extending into said retainer; a spring having an axially spaced pair of coil portions disposed between the web portions of said retainer and channel member in registry with said one opening in said retainer and in longitudinally straddling relation to said tab projection, said spring having integral leg portions extending through said one opening in vertical diverging relation to each other and to said stem, said leg portions being positioned between said stem and said backing strips; and an elongated fastening element inserted through said aligned holes and aperture in said channel member and tab projection, respectively, for preventing relative movement between said channel member and said wear strip.

5. In a cotton harvester unit having parts forming a plant confining tunnel extending longitudinally in the general direction oof travel, and having a picking mechanism operatively mounted on said unit and including a series of spaced apart vertically extending slats each rotatably supporting a series of vertically spaced spindles presenting picking portions extending transversely from one side of said slat into said tunnel and presenting cylindrical portions disposed in the other side of said slat, said cylindrical portions being arranged in spaced vertically opposite pairs aligned longitudinally with corresponding vertically opposite pairs of cylindrical portions on spindles of other slats for driven frictional engagement with a drive assembly fixed between said cylindrical portions, the combination comprising: a plurality of U-shaped channel members mounted on said unit for limited adjustment both vertically and horizontally relative to said unit and each having its flanges provided with at least one pair of holes in vertical alignment therethrough intermediate the ends thereof, said members being adjustably fixed on said unit to extend along the other side of said slat with each member in generally parallel transversely opposite relation to a longitudinally aligned series of said vertically opposite cylindrical portions with its open side facing said series and with said pair of holes being in vertical alignment with the like holes in other members; a U-shaped retainer partially nested within each channel member with each retainer having its open side similarly facing a horizontally aligned one of said series of cylindrical portions, said retainers having a longitudinal series of elongated openings extending through the web thereof with the midportion of one of said openings being horizontally opposite said pair of holes in the associated channel member; a wear strip of T-shape cross sectional configuration associated with each of said retainers by having its free stem end extending into said retainer between the flanges thereof and having a portion of its stem adjacent its head disposed between the said cylindrical portions in said series, said wear strips each having a tab projection on said free stem end extending through the midportion of said one hole in the associated retainer and provided with an aperture therethrough in vertical alignment with said pair of holes in said channel members; a pair of backing strips extending along opposite sides of the stem portion of each wear strip and having their marginal edges adjacent said channel member and extending into the associated retainer; springs disposed between the web portions of each retainer and the associated channel member and conforming in number to the elongated openings in said retainer, said springs each having a pair of axially spaced coil portions in registry with an opening in said retainer, said coil portions of one spring registering with said one opening in longitudinally straddling relation to said tab projection, said springs each having integral leg portions extending through the associated one of said openings in vertically diverging relation to each other and in vertically straddling relation to said stem portion, said leg portions being positioned between said stem portion and the adjacent backing strip; and an elongated fastening element inserted through said aligned holes and apertures in said channel members and tab projections, respectively, for preventing relative movement between said wear strip, said retainer and said channel member.

6. In a cotton harvester unit having parts forming a plant confining tunnel extending longitudinally in the general direction of travel, and having a picking mechanism operatively mounted on said unit and including a series of spaced apart vertically extending slats each rotatably supporting a series of vertically spaced spindles presenting picking portions extending transversely from one side of said slat into said tunnel and presenting cylindrical portions disposed in the other side of said slat and arranged in spaced vertically opposite pairs aligned longitudinally with corresponding vertically opposite pairs of cylindrical portions on spindles of other slats for driven frictional engagement with a drive assembly fixed between said cylindrical portions, the combination comprising: a U-shaped channel member mounted on said unit for limited adjustment both vertically and horizontally relative to said unit and having its flanges provided with pairs of vertically aligned holes therethrough with at least one pair of said holes located intermediate the ends of said member and with proximate pairs of said holes located adjacent one of said ends, said member being adjustably fixed on said unit to extend along the other side of said slat in generally parallel opposite relation to a longitudinally aligned series of said vertically opposite pairs of cylindrical portions with its open side facing said series; a U-shaped retainer partially nested within said channel member with its open side similarly facing said series of cylindrical portions, said retainer having a longitudinal series of spaced elongated openings extending through the web thereof with the midportion of one of said openings being horizontally opposite said pair of holes extending vertically through said intermediate portion of said channel member; a wear strip of T-shape cross sectional configuration having its free stem end extending into said retainer and having a portion of its stem adjacent its head disposed between said cylindrical portions in said series, said wear strip having a tab projection on its free stem end extending through the midportion of said one opening in said retainer, said tab projection being provided with an aperture therethrough in vertical alignment with said pair of holes extending through said intermediate portion of said channel member; a pair of backing strips extending along opposite sides of the stem portion of said wear strip and having their marginal edges adjacent said channel member and extending into said retainer; springs disposed between and in contact with the web portions of said retainer and channel member, said springs each having a pair of axially spaced coil portions in registry with an opening in said retainer with the coil portions of one spring registering with said one opening in longitudinally straddling relation to said tab projection, said springs each having integral leg portions extending through the associated one of said openings in vertically diverging relation to each other and in vertically straddling relation to said stem, said leg portions being disposed between said stem portion and said backing strips; an elongated fastening element inserted through said aligned holes and aperture in said channel member and tab projection, respectively; an attaching part fixedly uniting the ends of said wear and backing strips disposed adjacent said one end of said channel member, said attaching part including an aperture therein alignable with one of the pairs of holes in said one end of said channel member; and another elongated fastening element inserted through said aligned holes in said one end of the channel member and the aperture in said attaching part aligned therewith, said elongated fastening elements preventing relative movement of said wear strip, said retainer and said channel member.

7. For use with a cotton harvester unit having a picking mechanism operatively mounted on said unit and including a series of spaced apart vertically extending slats each rotatably supporting a series of vertically spaced spindles presenting picking portions extending transversely from one side of said slat into a plant confining tunnel and presenting cylindrical portions disposed in the other side of said slat and arranged in spaced vertically opposite pairs aligned longitudinally with corresponding vertically opposite pairs of cylindrical portions on other slats for driven frictional engagement with a drive assembly fixed between said cylindrical portions, and having a U-shaped channel member fixedly mounted on said unit to extend in generally parallel opposite relation to a longitudinally aligned series of said vertically opposite pairs of cylindrical portions with its open side facing said series, said member having its flanges provided with at least one pair of holes in vertical alignment therethrough intermediate the ends thereof, a drive assembly comprising: a U-shaped spring retainer having a longitudinal series of elongated openings extending through the web thereof; said retainer being dimensioned for nested insertion into said channel member with the midportion of one of said openings disposed horizontally opposite said pair of holes extending vertically through the flanges of the channel member intermediate the ends thereof; a wear strip of T-shape cross sectional configuration having its free stem end disposed between the flanges of said retainer and having a tab projection in said end extending through the midportion of said one opening in said retainer, said tab projection being provided with an aperture therethrough on an axis generally at a right angle to the flanges of said retainer; a pair of backing strips extending along opposite sides of the stem portion of said wear strip and having their marginal edges remote from the head portion of said wear strip disposed between the flanges of said retainer; an attaching part fixedly uniting one end of said wear strip with the corresponding ends of said backing strip; springs combined with said retainer and conforming in number to said elongated openings therein, said springs each having a pair of axially spaced coil portions positioned adjacent the web portion of said retainer in registering relation with one of said openings in said retainer, one of said springs registering with said one opening in longitudinal straddling relation to said tab projection, said springs each having integral leg portions extending through said openings in diverging relation to each other and in vertical straddling relation to said stem portion, said leg portions being positioned between said stem portion and said backing strips.

8. For use with cotton harvester unit having a picking mechanism operatively mounted on said unit and including a series of spaced apart vertically extending slats each rotatably supporting a series of vertically spaced spindles presenting picking portions extending transversely from one side of said slat into a plant confining tunnel and presenting cylindrical portions disposed in the other side of said slat and arranged in spaced vertically opposite pairs aligned longitudinally with corresponding vertically opposite pairs of cylindrical portions on spindles of other slats for driven frictional engagement with a drive assembly fixed between said cylindrical portions, and having a U-shaped channel member fixedly mounted on said unit to extend in generally parallel opposite relation to a longitudinally aligned series of said vertically opposite pairs of cylindrical portions with its open side facing said series, said member having its flanges provided with at least one pair of holes in vertical alignment therethrough intermediate the ends thereof, a drive assembly comprising: a spring retainer strip having a longitudinal series of spaced elongated openings extending therethrough, said retainer being dimensioned for removable coaction with said channel member with the midportion of one of said openings being disposed horizontally opposite said pair of holes extending vertically through the flanges of the channel member intermediate the ends thereof; a wear strip of T-shape cross sectional configuration having its free stem end disposed adjacent said retainer and being provided with a tab projection extending through the midportion of said one opening in said retainer, said tab projection being provided with an aperture therethrough aligned with said vertical holes; a pair of backing strips extending along opposite sides of the stem portion of said wear strip; an attaching part fixedly uniting one end of said wear strip with the corresponding ends of said backing strip; springs removably combined with said retainer and conforming in number to said elongated openings, said springs each having coil portions in registry with an opening in said retainer with the coil portions of the spring registering with said one opening, said coil portions being axially spaced apart in longitudinal straddling relation to said tab projection, said springs each having integral leg portions extending through the associated one of said openings in diverging relation to each other, said legs being positioned between said wear strip and the adjacent backing strip; and an elongated fastening element inserted through said aligned holes and aperture for preventing relative movement of said wear strip and said channel member.

9. For use with a cotton harvester unit having a picking mechanism operatively mounted thereon including a series of spaced apart vertically extending slats each rotatably supporting a series of vertically spaced spindles presenting picking portions extending transversely from one side of said slat into a plant confining tunnel and presenting cylindrical portions disposed in the other side of said slat and arranged in spaced vertically opposite pairs aligned longitudinally with corresponding vertically opposite pairs of cylindrical portions on spindles of other slats for frictional engagement with a drive assembly fixed between said cylindrical portions, and having a channel member fixedly mounted on said unit to extend in generally parallel opposite relation to a longitudinally aligned series of said vertically opposite pairs of cylindrical portions with its open side facing said series, said member having a flange provided with a hole extending vertically therethrough intermediate the ends thereof, a friction drive assembly comprising: a spring retainer having an opening therein, said retainer being dimensioned for removable coaction with said channel member to position a portion of said opening horizontally opposite said hole; a wear strip of T-shape cross sectional configuration having its free stem end disposed adjacent said retainer and being provided with a tab projection extending through said opening in said retainer, said tab projection being provided with an aperture therethrough adapted for alignment with said hole; a pair of backing strips extending along opposite sides of the stem portion of said wear strip; an attaching part fixedly uniting one end of said wear strip with the corresponding ends of said backing strips; and a spring removably combined with said retainer and having an axially spaced pair of coil portions disposed in registry with said opening and in straddling relation to said tab projection, said spring having integral leg portions extending through said opening in diverging relation to each other and in straddling relation to said stem portion, said legs being positioned between said stem portion and said backing strips.

10. For use with a cotton harvester unit having a picking mechanism operatively mounted on said unit and including a series of spaced apart vertically extending slats each rotatably supporting a series of vertically spaced spindles presenting picking portions extending transversely from one side of said slat into a plant confining tunnel and presenting cylindrical portions disposed in the other side of said slat and arranged in spaced vertically opposite pairs aligned longitudinally with corresponding vertically opposite pairs of cylindrical portions on spindles of other slats for driven frictional engagement with a drive assembly fixed between said cylindrical portions, and having a channel member fixedly mounted on said unit to extend in generally parallel opposite relation to a longitudinally aligned series of said pairs of vertically opposite cylindrical portions with its open side facing said series, said member having a flange provided with a hole extending vertically therethrough intermediate the ends thereof, a friction drive assembly comprising: a wear strip of T-shape cross sectional configuration and having a portion of its stem adjacent its head positioned between said longitudinally aligned series of vertically opposite cylindrical spindle portions with its free stem end terminating adjacent said channel member, said free stem end being provided with an apertured tab projecting therefrom in position for aligning the aperture therein with said hole; a pair of backing strips approximately coextensive with and extending along opposite sides of the stem portion of said wear strip; and an attaching part fixedly uniting one end of said wear strip with the corresponding ends of said backing strips.

11. For use with a cotton harvester unit having a picking mechanism operatively mounted on said unit and including a series of spaced apart vertically extending slats each rotatably supporting a series of vertically spaced spindles presenting picking portions extending transversely from one side of said slat in a plant confining tunnel and presenting cylindrical portions disposed in the opposite side of said slat and arranged in spaced vertically opposite pairs aligned longitudinally with corresponding vertically opposite pairs of cylindrical portions on spindles of other slats for driven frictional engagement with a drive assembly fixed between said cylindrical portions, and having a channel member fixedly mounted on said unit to extend in generally parallel opposite relation to a longitudinally aligned series of said vertically opposite cylindrical portions with its open side facing said series, said member having a flange provided with holes therethrough including at least one hole through a portion intermediate the ends thereof and other holes being through portions adjacent the ends thereof, a friction drive assembly comprising: a wear strip of T-shape cross sectional configuration and having a portion of its stem adjacent its head positioned between said longitudinally aligned series of vertically opposite cylindrical spindle portions with its free stem end terminating adjacent said channel member, said free stem end being provided with at least three apertured tabs projecting therefrom and through said openings in position for vertically aligning the apertures thereof, respectively, with said holes, a pair of backing strips approximately coextensive with and extending along opposite sides of the stem portion of said wear strip; and an attaching part fixedly uniting one end of said wear strip with the corresponding ends of said backing strips.

References Cited in the file of this patent

UNITED STATES PATENTS

| | | |
|---|---|---|
| 2,058,513 | Rust et al. | Oct. 27, 1936 |
| 2,440,450 | Rust | Apr. 27, 1948 |
| 2,665,536 | Rust | Jan. 12, 1954 |
| 2,671,298 | Fergason | Mar. 9, 1954 |